(12) United States Patent
Traser et al.

(10) Patent No.: US 12,195,912 B2
(45) Date of Patent: Jan. 14, 2025

(54) THERMALLY FUSIBLE SHEET BODY

(71) Applicant: Carl Freudenberg KG, Weinheim (DE)

(72) Inventors: Steffen Traser, Darmstadt (DE); Steffen Kremser, Heddesheim (DE)

(73) Assignee: CARL FREUDENBERG KG, Weinheim (DE)

( * ) Notice: Subject to any disclaimer, the term of this patent is extended or adjusted under 35 U.S.C. 154(b) by 761 days.

(21) Appl. No.: 16/756,471

(22) PCT Filed: Oct. 26, 2018

(86) PCT No.: PCT/EP2018/079386
§ 371 (c)(1),
(2) Date: Apr. 16, 2020

(87) PCT Pub. No.: WO2019/081696
PCT Pub. Date: May 2, 2019

(65) Prior Publication Data
US 2021/0198842 A1    Jul. 1, 2021

(30) Foreign Application Priority Data

Oct. 27, 2017   (DE) .................. 10 2017 010 022
Apr. 19, 2018   (DE) .................. 10 2018 109 359

(51) Int. Cl.
*D06M 17/10*   (2006.01)
*B32B 37/12*    (2006.01)
(Continued)

(52) U.S. Cl.
CPC ......... *D06M 17/10* (2013.01); *B32B 37/1207* (2013.01); *B32B 37/1292* (2013.01);
(Continued)

(58) Field of Classification Search
None
See application file for complete search history.

(56) References Cited

U.S. PATENT DOCUMENTS 3,252,848  A      5/1966   Borsellino, V
5,455,293  A  *  10/1995   Wood ..................... C08G 18/10
                                                            524/270
(Continued)

FOREIGN PATENT DOCUMENTS

DE            60127692 T2    12/2007
DE        102012009055 B4     6/2015
(Continued)

OTHER PUBLICATIONS

Sheng Maogui et al., "Production Technology and Application of New Polyurethane Resin Coatings", Feb. 2001, p. 255-258, Guangdong Science & Technology Press, Guangzhou, Guangdong, China.
(Continued)

*Primary Examiner* — Scott R. Walshon
*Assistant Examiner* — Thomas A Mangohig
(74) *Attorney, Agent, or Firm* — LEYDIG, VOIT & MAYER, LTD.

(57) ABSTRACT

A thermally fusible textile fabric usable as a fusible interlining material in the textile industry includes: a backing layer having a textile material on top of which has been applied an adhesive compound structure including a polyurethane coating containing a polyurethane mixture including at least one polyester urethane, at least one polyether urethane, and at least one polycarbonate urethane. The polyurethane mixture has been at least partially crosslinked with a crosslinker including at least one isocyanate blocked with a blocking agent at at least one isocyanate group.

21 Claims, 2 Drawing Sheets

(51) Int. Cl.
*C09J 7/21* (2018.01)
*C09J 7/35* (2018.01)
*C09J 7/38* (2018.01)
*D06N 7/00* (2006.01)
*B32B 38/00* (2006.01)

(52) U.S. Cl.
CPC . *C09J 7/21* (2018.01); *C09J 7/35* (2018.01); *C09J 7/38* (2018.01); *D06N 7/0092* (2013.01); *B32B 2038/0076* (2013.01); *B32B 2305/18* (2013.01); *B32B 2305/72* (2013.01); *C09J 2301/208* (2020.08); *C09J 2301/408* (2020.08); *C09J 2475/00* (2013.01); *Y10T 442/2746* (2015.04)

(56) References Cited

U.S. PATENT DOCUMENTS

| | | |
|---|---|---|
| 2002/0114955 A1 | 8/2002 | Lamers |
| 2004/0067318 A1* | 4/2004 | Jones ................... C08G 18/807 528/45 |
| 2007/0260014 A1 | 11/2007 | Simon |
| 2008/0004395 A1* | 1/2008 | Covelli ............... C08G 18/282 524/591 |
| 2008/0287574 A1* | 11/2008 | Loth ....................... C09J 11/04 524/588 |
| 2009/0208759 A1 | 8/2009 | Kanagawa |
| 2010/0272912 A1* | 10/2010 | Grynaeus ................ D04H 5/00 427/389.9 |
| 2015/0133014 A1 | 5/2015 | Traser |
| 2018/0057983 A1 | 3/2018 | Traser |

FOREIGN PATENT DOCUMENTS

| | | |
|---|---|---|
| DE | 102015005089 A1 | 10/2016 |
| JP | 2001026762 A | 1/2001 |
| WO | WO 02055577 A1 | 7/2002 |
| WO | WO 2005035614 A1 | 4/2005 |
| WO | WO 2008065921 A1 | 6/2008 |
| WO | WO 2009014973 A2 | 1/2009 |
| WO | WO 2013167250 A1 | 11/2013 |
| WO | WO 2016169752 A1 | 10/2016 |

OTHER PUBLICATIONS

English language translation of Chinese Office Action, dated Jan. 10, 2022.

* cited by examiner

THERMALLY FUSIBLE SHEET BODY

CROSS-REFERENCE TO PRIOR APPLICATIONS

This application is a U.S. National Phase application under 35 U.S.C. § 371 of International Application No. PCT/EP2018/079386, filed on Oct. 26, 2018, and claims benefit to German Patent Application No. DE 10 2017 010 022.5, filed on Oct. 27, 2017, and German Patent Application No. DE 10 2018 109 359.4, filed on Apr. 19, 2018. The International Application was published in German on May 2, 2019 as WO 2019/081696 under PCT Article 21(2).

FIELD

The invention relates to thermally fusible textile fabrics which are usable in particular as fusible interlining or lining materials in the textile industry and which are characterized by improved application properties, by improved post-processing properties, in particular in dyeing treatments (garment dyeing) and an improved processability, as well as the production and use thereof as interlinings for textiles.

BACKGROUND

Interlining materials are the invisible framework of clothing. They ensure correct fit and optimal wear comfort. Depending on the application, they support processability, increase functionality and stabilize the clothing. In addition to clothing, these functions can be used in industrial textile applications, such as of the furniture, upholstery and home textile industry.

Important property profiles for interlining materials are softness, resilience, feel, wash and care resistance and sufficient wear resistance of the backing material during use.

Interlining materials can consist of non-wovens, wovens, knitted fabrics or comparable textile fabrics, which are usually additionally provided with an adhesive compound, as a result of which the interlining can be adhesively bonded usually thermally by heat and/or pressure (fusible interlining). The interlining is thus laminated to an outer fabric. The various textile fabrics mentioned have different property profiles depending on the production method. Wovens consist of threads/yarns in warp and weft directions, knitted fabrics consist of threads/yarns which are joined via a stitch bond to form a textile fabric. Non-wovens consist of individual fibers which are laid down to form a fibrous web and which are bonded mechanically, chemically or thermally.

In the case of mechanically bonded non-wovens, the fibrous web is strengthened by mechanically interweaving the fibers. Either a needle technique or interweaving by means of water or steam jets is used for this purpose. Whilst needling results in soft products, they have a relatively delicate feel so that this technology could only be established in very specific niche areas in the field of interlining materials. Moreover, mechanical needling usually relies on an area density of >50 $g/m^2$, which is too heavy for a large number of interlining material applications.

Non-wovens compacted with water jets can be produced in lower area densities but are generally flat and less resilient.

In the case of chemically bonded non-wovens, the fibrous web is provided with a binder (for example acrylate binder) by impregnation, spraying or by means of otherwise customary application methods and subsequently condensed. The binder mutually binds the fibers to form a non-woven, resulting, however, in a relatively stiff product being obtained since the binder extends over wide parts of the fibrous web and bonds the fibers continuously together like in a composite material. Variations in the feel or softness can only be compensated for to a limited extent via fiber mixtures or binder selection.

For use as interlining materials, thermally bonded non-wovens are usually compacted by calender or by means of hot air. Nowadays, punctiform calender compacting has been established as standard technology for interlining non-wovens. The fibrous web typically consists of fibers of polyester or polyamide specifically developed for this process and is compacted by means of a calender at temperatures around the melting point of the fiber, a roll of the calender being provided with a dot engraving. Such a dot engraving consists, for example, of 64 dots/$cm^2$ and can, for example, have a welding surface of 12%. Without a dot arrangement, the interlining material would be compacted like a sheet and unsuitably hard to the touch.

The different methods described above for the production of textile fabrics are known and described in the specialist books and in patent literature.

The adhesive compounds, which are usually applied to interlining materials, can usually be activated thermally and generally consist of thermoplastic polymers. The technology for applying these adhesive compound coatings to the fibrous textile fabric is carried out according to the prior art in a separate work step. Powder-dot, paste-printing, double-dot, scattering and hot-melting processes are conventionally known as adhesive compound technology and are described in patent literature. Today, the double-dot coating is considered to be the most efficient in terms of bonding with the outer fabric, even after care treatment and in relation to back-tacking.

Such a double dot has a two-layer structure. It consists of a base dot and a top dot. The base dot penetrates into the base material and serves as a barrier layer against adhesive compound strike-back and for anchoring the top dot particles. Customary base dots consist, for example, of binder and/or of a thermoplastic polymer which contributes to the bond strength during fusing. Depending on the chemicals used, the base dot, in addition to anchoring in the base material, also contributes as a barrier layer for preventing adhesive compound strike-back. The principle adhesive constituent in the two-layer composite is primarily the top dot. The top dot can consist of a thermoplastic material which is scattered onto the base dot as a powder. After the scattering process, the excess part of the powder (between the dots of the bottom layer) is expediently suctioned off again. After subsequent sintering, the top dot is (thermally) bonded to the base dot and can serve as adhesive to the top dot.

Depending on the intended application of the interlining material, a different number of dots are printed and/or the adhesion compound quantity or the geometry of the dot pattern is varied. A typical number of dots is, for example, CP 110 with a coating of 9 $g/m^2$ or CP 52 with a coating quantity of 11 $g/m^2$.

Paste printing is also common. In this technology, an aqueous dispersion of thermoplastic polymers, usually in particle form with a particle size of <80 μm, thickeners and flow aids, is produced and then printed as a paste onto the backing layer usually in a punctiform manner by means of a rotary screen printing method. The printed backing layer is then expediently subjected to a drying process.

It is known that a wide variety of hot-melt adhesives can be used as bonding agents for the hot-bonding for interlining or lining materials.

A current trend in the clothing industry, especially in ladies' outerwear, are thin, transparent, flexible or open outer fabrics. An interlining which has a very light and open structure is suitable for supporting such outer fabrics.

The coating of such materials with common aqueous paste systems is a problem in this case since these systems penetrate through the base during the coating process and in subsequent steps contaminate the production plants considerably. This not only considerably worsens the quality of the article, but the production plants must be stopped significantly more often in order to laboriously clean machine parts.

Furthermore, penetration results in the adhesive compound base dot not forming well and in an inhomogeneous, slightly convex dot forming after the powder (double-dot coating) has been scattered. The spreading of the dot further results in the base dot being "smeared" so that the powder cannot be suctioned off well in the edge regions of the base dot and also in some of the interspaces. In addition to contaminating the plant, this results in a weakening of the composite after bonding.

A further disadvantage of the known adhesive compound base dots is that they are only conditionally suitable for after-treatment processes, in particular "garment dyeing" applications, and must also be applied at comparatively high fusing conditions/temperatures.

SUMMARY

In an embodiment, the present invention provides a thermally fusible textile fabric usable as a fusible interlining material in the textile industry, comprising: a backing layer comprising a textile material on top of which has been applied an adhesive compound structure comprising a polyurethane coating containing a polyurethane mixture comprising at least one polyester urethane, at least one polyether urethane, and at least one polycarbonate urethane, wherein the polyurethane mixture has been at least partially crosslinked with a crosslinker comprising at least one isocyanate blocked with a blocking agent at at least one isocyanate group.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
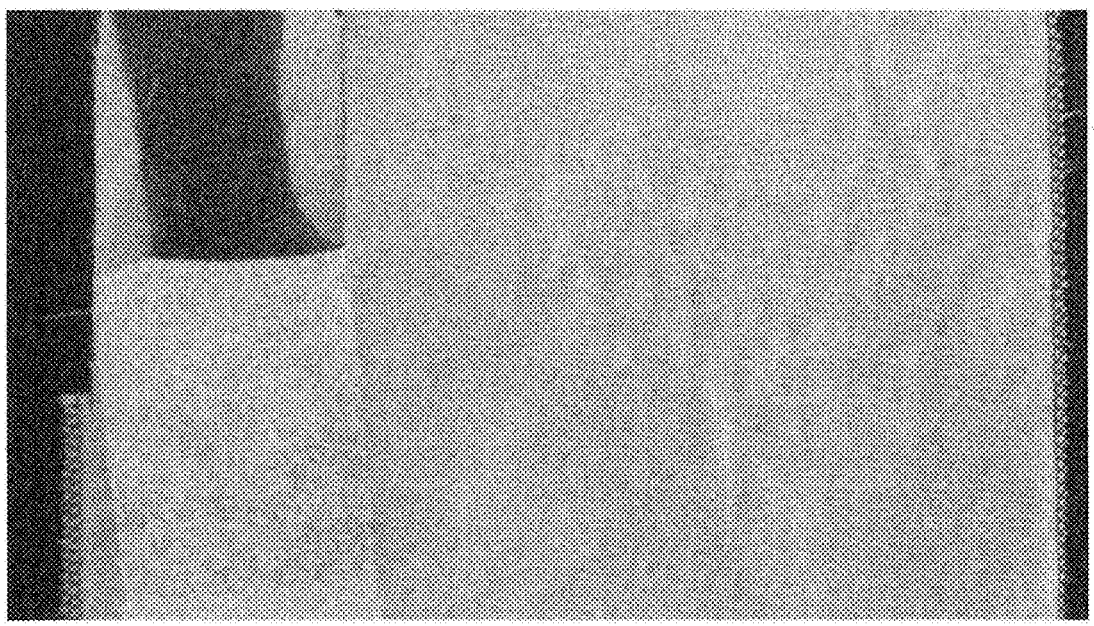
FIG. 1 shows the surface of the knitted fabric coated with the non-inventive polyurethane binder base dot. A very irregular surface with mole tunnels (partial debonding of the interlining, Note 4) can be seen. Almost the entire double-dot coating is transferred to the outer fabric, i.e., the base dot after garment dyeing treatment debonds from the base.
Figure 2:
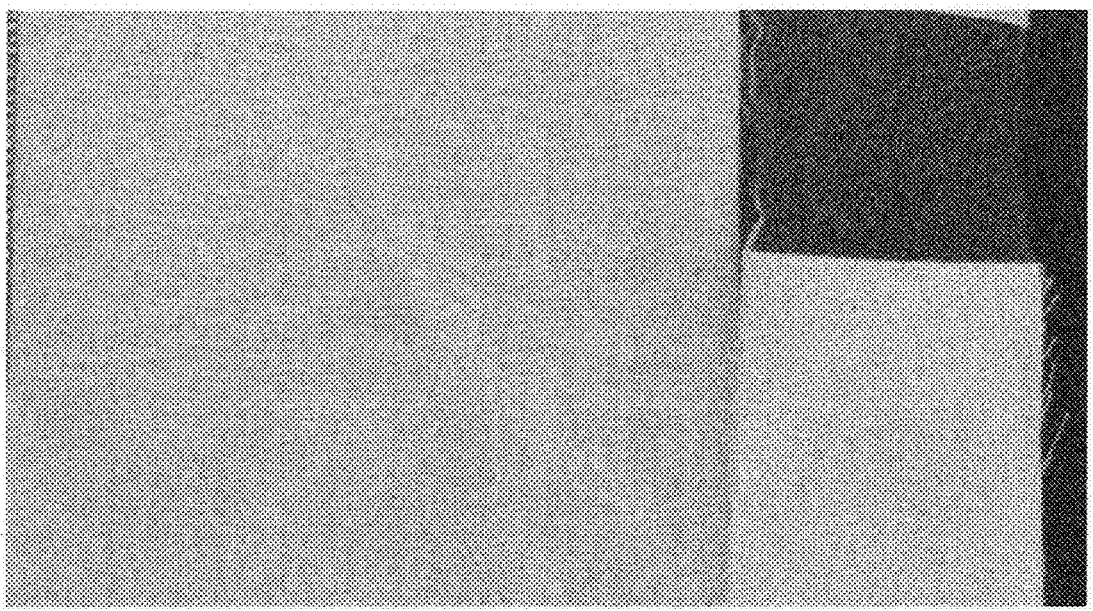
FIG. 2 shows the surface of the knitted fabric coated with the polyurethane binder base dot according to the invention. A very smooth, calm surface without mole tunnels can be seen. The complete surface is fused (Note 1). A large part of the double dot and thus the base dot remains anchored in the base after garment dyeing treatment. Only a small transfer of top dot polymer into the outer fabric takes place.

In an embodiment, the present invention provides textile fabrics comprising a backing layer made of a textile material onto which a polyurethane coating is applied, which has excellent post-processing properties, x particular in dyeing (garment dyeing) treatments. Furthermore, there should be very little back-tacking, particularly in the case of light (area density 10-30 g/m$^2$) and/or open backing layers, and no contamination should occur when the polyurethane coating is applied in the plant.

In addition, the textile fabrics should be chemically resistant to cleaning, exhibit very good washing resistance up to 95° C., and also withstand drying conditions with a high number of cycles.

This object is accomplished according to the invention by a thermally fusible textile fabric usable in particular as a thermally fusible interlining material in the textile industry, with a backing layer made of a textile material on top of which has been applied an adhesive compound structure comprising a polyurethane coating containing a polyurethane mixture comprising at least one polyester urethane (B1), at least one polyether urethane (B2) and at least one polycarbonate urethane (B3) and wherein the polyurethane mixture has been at least partially crosslinked with a crosslinker comprising at least one isocyanate blocked with a blocking agent at at least one isocyanate group.

The polyurethane mixture can be produced by mixing the at least one polyester urethane (B1) with the at least one polyether urethane (B2) and the at least one polycarbonate urethane (B3) and subsequently at least partially crosslinking with a crosslinker comprising an isocyanate blocked with a blocking agent at at least one isocyanate group.

Isocyanates in the context of the invention have a substituted or unsubstituted C1-C40, preferably C3-C18 alkyl, aryl or aralkyl radical as base body which has one or more isocyanate groups. Particularly preferred isocyanates are aliphatic polyisocyanates, such as hexamethylene diisocyanate (HDI). Also suitable are methylene diphenyl isocyanate (MDI), isophorone diisocyanate (IPDI), 4,4-dicyclohexylmethane diisocyanate (H12MDI). The isocyanates may be present in an equilibrium reaction in oligomerized form, for example as a dimer or trimer. The chain lengths mentioned above refer to the monomer units.

Particularly preferred according to the invention are aliphatic isocyanates, in particular isocyanates having a C3-C18 alkyl radical, preferably C4-C12 alkyl radical, as base body. In practical tests, it was in particular found that their use can greatly increase the washing stability of the fused interlining. This is believed to be due to the formation of a highly hydrophobic interpenetrating network resulting from the good mobility of the aliphatic backbone.

The polyester urethane (B1) is obtainable by reacting
- at least one bifunctional, preferably aliphatic, cycloaliphatic or aromatic polyisocyanate (A), having an isocyanate content of 5 to 65 wt. %, with
- at least one polyester polyol (b1), and optionally with
- at least one chain extender (C).

The polyether urethane (B2) is obtainable by reacting
- at least one bifunctional, preferably aliphatic, cycloaliphatic or aromatic polyisocyanate (A), having an isocyanate content of 5 to 65 wt. %, with
- at least one polyether polyol (b2), and optionally with
- at least one chain extender (C).

The polycarbonate urethane (B3) is obtainable by reacting
- at least one bifunctional, preferably aliphatic, cycloaliphatic or aromatic polyisocyanate (A), having an isocyanate content of 5 to 65 wt. %, with
- at least one polycarbonate polyol (b3) and optionally with
- at least one chain extender (C).

According to the invention, the textile fabric has a polyurethane coating comprising a polyurethane mixture of at least one polyester urethane (B1), at least one polyether urethane (B2) and at least one polycarbonate urethane (B3), wherein the polyurethane mixture has been at least partially crosslinked with a crosslinker comprising an isocyanate blocked with a blocking agent at at least one isocyanate group.

It has been found that the textile fabric according to the invention has excellent post-processing properties, in particular in dyeing (garment dyeing) treatments. Furthermore, there is very little back-tacking, particularly in the case of light (area density 10-30 $g/m^2$) and/or open backing layers, and no contamination occurs when the polyurethane coating is applied in the plant.

In addition, the textile fabric is chemically resistant to cleaning, exhibits very good washing resistance up to 95° C., and also withstands drying conditions with a high number of cycles.

Without specifying a mechanism, it is believed that the excellent properties of the textile fabric can be achieved by the specific, customized combination of polyester polyurethane (B1), polyether polyurethane (B2) and polycarbonate polyurethane (B3) with an at least partially blocked isocyanate as crosslinker. It is assumed here that the polyether polyurethane (B2) formed from polyether polyol (b2) together with the polycarbonate polyurethane (B3) formed from polycarbonate polyol (b3) results in the excellent washing resistance of the textile fabric and the polyester polyurethane (B1) formed from polyester polyol (b1) results in the excellent haptics and elasticity thereof.

According to its conventional meaning, the term "blocked isocyanate" describes the fact that the isocyanate is present as an addition compound with a blocking agent, in particular alcohols (urethanes) and/or amines (ureas), when brought into contact with the polyurethane mixture. This addition compound can release the isocyanate again at higher temperatures, whereby crosslinking of the polyurethane mixture can be initiated.

The time of crosslinking can be adjusted in a targeted manner by using the blocked isocyanate. Crosslinking can hereby be prevented from already occurring during the coating process, which could lead to imperfections in the coating. Furthermore, by using a blocked isocyanate, a customized degree of crosslinking can be adjusted, whereby the cohesion in the base dot and its adhesion to the coated substrate can be optimized. This results in an improved quality of the surface of the textile fabric, and in particular to an increase in performance of the separation force of the polyurethane mixture, which is also maintained in mechanically demanding post-processing processes, such as garment dyeing.

A further advantage of using the blocked isocyanate as crosslinker is that the viscoelastic properties of the polyurethane mixture can be specifically modulated by modulating the polyurethane mixture and the peeling behavior can be adjusted in a targeted manner. In addition, both the feel and the cleaning resistance of the textile fabric can be varied in a targeted manner by the blocked isocyanate.

The polyurethane mixture is preferably only crosslinked by means of isocyanate. However, it is also conceivable for further crosslinkers, for example aziridines, to be present.

In a preferred embodiment of the invention, the polyurethane mixture comprises the crosslinker in an amount of 0.1 to 20 wt. %, more preferably of 1 to 10 wt. %, in particular of 2 to 6 wt. %, based in each case on the total weight of polyurethane (B1), (B2) and (B3).

In a preferred embodiment of the invention, the polyurethane mixture has a degree of crosslinking of 0.01 to 0.5, more preferably of 0.05 to 0.3, in particular of 0.1 to 0.2. The degree of crosslinking can be calculated from the ratio of the total number of isocyanate groups in the isocyanate to the total number of isocyanate-reactive groups in the polyurethanes B1, B2 and B3, taking into account the amounts used in each case.

Preferably, according to the invention, the blocking agent has a deblocking temperature of below 160° C., for example 110-140° C., more preferably 120-130° C.

Particularly preferred blocking agents according to the invention are selected from the group consisting of 3,5-dimethylpyrazole (DMP), acetoacetic acid, malonic ester, butanone oxime, secondary amines, caprolactam, phenols, alcohols and mixtures thereof. Very particular preference is given here to DMP since it leads to excellent crosslinking of the polymers, is nontoxic and deblocks even at low temperatures around 120-130° C.

The isocyanate may be present in blocked form in one or a plurality of isocyanate groups.

In practical experiments, it has been found that surprisingly good washing resistance and high elasticity of the textile fabric can be achieved by using the specific polyurethane mixture. Stiffer non-wovens can thus also be used without experiencing any disadvantages in the overall haptic performance. Furthermore, it is also possible to confer high elasticity on the textile fabrics solely by means of the polyurethane coating, without having to resort to fibers (for example BIKO fibers) or yarns having high elasticity. As a result, new products with specific properties can be produced, such as an elastic waistband interlining based on a conventional polyamide/polyester non-woven.

A further advantage of using polyurethanes is that the textile fabric according to the invention has a soft, elastic, beautiful (pleasant) feel. The feel of the interlining is a significant and important test in the textile industry. In particular, it is advantageous that the pleasant feel can be achieved without silicone equipment for the base.

A further advantage of using polyurethanes is that there is great synthesis latitude. A large selection of monomers is thus available for the polyurethane synthesis, which facilitates a simple adjustment of the desired physical properties, such as hardness, elasticity, etc.

$C_{4-18}$ aliphatic and/or $C_{6-20}$ cycloaliphatic and $C_{6-20}$ aromatic diisocyanates having isocyanate contents of 5 to 65 wt. % are preferably used as the bifunctional polyisocyanate (A).

Thus, 1,4-diisocyanatobutane, 1,6-diisocyanatohexane (HDI), 2-methyl-1,5-diisocyanatopentane, 1,5-diisocyanto-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,3- and 1,4-(isocyantomethyl)-cyclohexane, 1-isocyanato-3,3,5-trimethyl-5-isocyanatomethylcyclohexane (isophorone diisocyanate, IPDI), 4,4'-diisocyanatodicyclohexylmethane (Hi2MDI, HMDI), 1-isocyanato-1-methyl-4(3)isocyanato-methylcyclohexane and bis-(isocyantomethyl)-norbornane and/or isomer mixtures thereof and toluene-2,4-diisocyanate (TDI), 1,5-naphthalene diisocyanate (NDI), 3,3'-dimethyl-4,4'-biphenylene diisocyanate (TODI), 2,2'-diphenylmethane diisocyanate (2,2'-MDI), 2,4'-diphenylmethane diisocyanate (2,4'-MDI), 4,4'-diphenylmethane diisocyanate (4,4' MDI) and/or isomer mixtures thereof are particularly suitable.

It has been found that the aliphatic and cycloaliphatic diisocyanates 1,4-diisocyanatobutane, 1,6-diisocyanatohexane (HDI), 2-methyl-1,5-diisocyanatopentane, 1,5-diisocyanto-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,3- and 1,4-bis-(isocyanatomethyl)-cyclohexane, 1-isocyanato-3,3,5-trimethyl-5-isocyanatomethylcyclohexane (isophorone diisocyanate, IPDI), 4,4'-diisocyanatodicyclohexylmethane (H12MDI, HMDI), 1-isocyanato-1-methyl-4(3)isocyanato-methylcyclohexane and bis-(isocyantomethyl)-norbornane are particularly suitable.

Particularly preferred polyisocyanates according to A are 1,6-diisocyanatohexane (HDI), 1-isocyanato-3,3,5-trimethyl-5-isocyanatomethylcyclohexane (isophorone diisocyanate, IPDI) and 4,4'-diisocyanatodicyclohexylmethane. A particularly preferred polyisocyanate according to A is 1,6-diisocyanatohexane (HDI).

Particularly suitable polyols according to b are, for example, polyester polyols (b1) having a molecular weight of 400 g/mol to 6000 g/mol, more preferably of 1000 g/mol to 4000 g/mol, polyether polyols (b2) having a molecular weight of 400 g/mol to 6000 g/mol, and/or polycarbonate polyols (b3) having a molecular weight of 450 g/mol to 3000 g/mol.

In the context of the present invention, a polyester polyol (b1) is a polyester having more than one OH group, preferably two terminal OH groups. They can be prepared in known ways, for example from aliphatic hydroxycarboxylic acids or from aliphatic and/or aromatic dicarboxylic acids and one or more diols. Examples of suitable starting materials are succinic acid, adipic acid, suberic acid, azeleic acid, sebacic acid, dodecanedioic acid, glutaric acid, glutaric acid anhydride, phthalic acid, isophthalic acid, terephthalic acid, phthalic acid anhydride, ethylene glycol, diethylene glycol, 1,4-butanediol, 1,6-hexanediol, neopentyl glycol and ε-caprolactone.

According to the invention, a highly crystallizing polyester polyol is preferably used as polyester polyol. Suitable crystallizing polyester polyols are, for example, those based on linear, preferably uncrosslinked, aliphatic dicarboxylic acids having 6 to 12 carbon atoms in the molecule, such as adipic acid and dodecanedioic acid and linear diols having 4 to 8 carbon atoms in the molecule, preferably having an even number of carbon atoms, such as, 1,4-butanediol and 1,6-hexanediol. The polycaprolactone derivatives based on bifunctional starter molecules, such as, for example, 1,6-hexanediol, are also worthy of mention as being particularly suitable.

With regard to the polyether polyols (b2) and polycarbonate polyols (b3), preferred molecular weights are independently of one another in the range of 400 g/mol to 6000 g/mol, more preferably of 1000 g/mol to 4000 g/mol.

Suitable chain extenders according to C are divalent aliphatic C1-8 alcohols, for example ethylene glycol, 1,2-propanediol, 1,3-propanediol, 1,3-butanediol, 1,4-butanediol, 2,3-butanediol, cyclohexanedimethanol (CHDM) and 1,6-hexanediol.

Preferred chain extenders according to C have an even number of carbon atoms. 1,3-butanediol, 1,4-butanediol, 2,3-butanediol and isomer mixtures thereof and 1,6-hexanediol are worthy of mention here. Particularly preferred chain extenders according to C are 1,4-butanediol and 1,6-hexanediol.

The polyurethane coating can be produced in a simple manner in batch process, for example as follows:

The respective polyol (b1, b2 or b3) is degassed and dewatered at 90° C. under vacuum for a period of two hours. The polyol is subsequently heated to 100° C. and, while stirring, a catalyst, additives, such as hydrolysis inhibitors and antioxidants, and the chain extender or extenders are added successively. Finally, the polyisocyanate is added while stirring. As a result of the exothermic reaction which now takes place, the temperature of the reaction mixture rises sharply. At the same time, the viscosity of the reaction mixture increases continuously as the reaction progresses so that the reaction mixture is generally poured out when the reaction temperature, after the initially strong increase, has stabilized at an approximately constant value. The one-stage reaction of the components is referred to as one-shot process (one-stage process).

For larger batches, a continuous process via a reaction extruder is recommended.

The polyurethanes B1, B2 and B3 prepared as above can subsequently be mixed with one another and the at least partially blocked isocyanate can be added as crosslinker. The isocyanate is preferably deblocked directly after application to the textile fabric by heating, for example to temperatures of 80° C. to 200° C., more preferably to temperatures of 100° C. to 150° C., and in particular to temperatures of 120° C. to 140° C.

In practical experiments, it has been found that it is particularly expedient if the polyurethane mixture contains polyacrylic acid and/or polyurethane derivatives as thickeners. It has been found that a particularly uniform, bubble-free coating can be obtained through the use of said substances.

It is conceivable for the polyurethane mixture to contain a filler, in particular selected from aluminosilicates, preferably kaolin, calcium silicates, calcium carbonates, magnesium carbonates, phyllosilicates and aluminum oxides, such as wollastonites, dolomites, micas, baryte flours or talcum. The amount of filler in this case is preferably 0.5 to 55 wt. %, more preferably 5 to 45 wt. %, based on the total weight of the polyurethane mixture in each case. The filler preferably has an average particle size of 5 nm to 100 µm. By modulating the polyurethane mixture with fillers, its viscoelastic properties (rheology), the feel, the cleaning resistance, the pore-size distribution, the tack and the peeling behavior can also be adjusted in a targeted manner.

In a particularly preferred embodiment of the invention, the filler is silica having an average particle size of 2 to 20 µm, more preferably 3 to 15 µm, and in particular 7 to 10 µm. Likewise preferred is silica having an oil absorption value measured in accordance with DIN ISO 787-5 of 30 to 90 g/100 g µm, more preferably 50 to 80 g/100 g and in particular 60 to 80 g/100 g and/or with an average pore volume of 0.5 to 3 ml/g µm, more preferably 1 to 2 ml/g and in particular 1 to 1.5 ml/g. The silica is particularly preferably an amorphous and/or, in particular, hydrophilic silica. The amount of silica is preferably 0.5 to 55 wt. %, more preferably 1 to 20 wt. % and in particular 2 to 8 wt. %, in each case based on the total weight of the polyurethane mixture. In this embodiment, the polyurethane mixture contains other fillers, in particular the aforementioned other fillers, preferably in an amount of less than 10 wt. %, more preferably less than 5 wt. %, based on the total weight of the polyurethane mixture.

By using the silica, the flow property of the polyurethane mixture can be improved. This makes it possible to coat more rapidly and to obtain a more raised polyurethane coating, for example as a base dot, which is particularly advantageous for good bonding of the top dot and garment dyeing durability. Furthermore, the post-processing stability can be further increased by the homogeneous introduction of the filler and the price can be reduced. The use of the silica also improves the rheological behavior of the formulation, which is particularly advantageous in the case of light and/or open interlinings. In the case of these substrates, there is a very high risk that, during the coating process, the adhesive compound penetrates too much into the interlining or "breaks through" in the worst case. As a result, the primary adhesion decreases and/or the print head and the subsequent plant components become contaminated. This problem can be largely eliminated by using the fine-particle silica as filler. A further advantage of the fine-particle silica is its excellent dispersibility in the polyurethane mixture and also the good long-term stability of the dispersion.

The polyurethane mixture can furthermore also contain auxiliaries which, inter alia, contribute to the viscosity setting and the flow behavior of the dispersion. The haptics of the interlining material can be varied broadly by means of a suitable binder composition. In a further advantageous embodiment of the invention, the polyurethane mixture comprises an additive selected from activated carbon, carbon black, phase change materials (PCMs), thermoplastic polymer powder, Expancel, flock fibers, adhesion promoters, flame retardants, such as, Mg and/or Al hydroxides or phosphorus compounds, coating pigments, such as titanium oxide, super absorbers, such as polyacrylic acid, wood shavings, zeolites, metal powders, magnetic particles, such as iron oxides, encapsulated substances, such as paints, fragrances or active substances (wound dressing) or odor-absorbing substances, such as cyclodextrins or PVPs, preferably in an amount of 0.1 to 70 wt. %, more preferably 5 to 60 wt. %, in each case based on the total weight of the polyurethane mixture.

In a further preferred embodiment of the invention, polyurethanes B1, B2 and/or B3 with tensile strengths of preferably 5 to 50 MPa, more preferably 15 to 40 MPa, in particular 20 to 30 MPa, are used.

In a further preferred embodiment of the invention, polyurethanes B1, B2 and/or B3 with Shore hardnesses of preferably 30 to 120, more preferably 40 to 90, in particular 50 to 70, are used.

The area density of the polyurethane coating may vary depending on the desired properties of the textile fabric. As for most application purposes, it has proven to be beneficial to adjust an area density in the range of 0.1 $g/m^2$ to 40 $g/m^2$, preferably 0.5 $g/m^2$ to 20 $g/m^2$ and in particular 1 $g/m^2$ to 10 $g/m^2$.

The polyester urethane (B1), polyether urethane (B2) and polycarbonate urethane (B3) can be present in the polyurethane mixture both in pure form and in mixtures. It is also conceivable for the polyurethane mixture to contain still further polymers in addition to the polyurethanes. The polymers that differ from the polyester urethane (B1), polyether urethane (B2) and polycarbonate urethane (B3) may comprise, for example, polyacrylates, silicones, (co-)polyester-, (co-)polyamide-, polyolefin-, styrene acrylate-, SBR-, NBR- and ethylene vinyl acetate-based polymers and/or combinations (mixtures and copolymers) of said polymers. The polyacrylates and silicones are particularly preferred according to the invention. The proportion of the polyurethane mixture in relation to the total amount of the polyurethane coating is preferably 20 to 100 wt. %, more preferably 30 to 90 wt. % and in particular 40 to 90 wt. %.

Furthermore, the polyurethane mixture preferably has a melting point >190° C. so that it does not contribute to the bond strength during fusing. This is particularly advantageous when the polyurethane mixture is applied as bottom layer since the latter then acts as a barrier layer with respect to thermoplastic layers applied thereto, which results in a low adhesive compound strike-back.

The textile fabric according to the invention also comprises a backing layer. The textile material to be used for the backing layer is selected with respect to the respective application purpose or the particular quality requirements. Suitable are, for example, wovens, knitted fabrics, crocheted fabrics or the like. In principle, no limits are set here by the invention. The person skilled in the art can easily find the material combination suitable for his application.

The non-woven, but also the threads or yarns of the textile materials, can consist of chemical fibers or also of natural fibers. The chemical fibers used are preferably polyester fibers, polyamide fibers, regenerated cellulose fibers and/or binder fibers, and wool fibers or cotton fibers are used as natural fibers.

The chemical fibers may include crimpable, crimped and/or uncrimped staple fibers, crimpable, crimped and/or uncrimped, directly spun continuous fibers, and/or finite fibers, such as meltblown fibers. The backing layer may be of single-layer or multi-layer construction.

The technologies presented at the outset can be used for the production of the non-woven. The fibers of the fibrous web can be joined here mechanically (conventional needling, water jet technology), by means of a binder, or thermally to form a non-woven. In this case, however, a moderate non-woven strength of the backing layer before printing is sufficient since the backing layer is additionally impinged upon by binder and compacted during printing with the mixture of binder and thermoplastic polymer. Cost-effective fiber raw materials can also be used for the moderate non-woven strengths, provided that they meet the requirements with respect to the feel. The process control can also be simplified.

Where staple fibers are used, it is advantageous to card them with at least one carding machine to form a fibrous web. A scattered design (random technology) is preferred here, but combinations of longitudinal and/or transverse design or even more complicated carding arrangements are also possible if specific non-woven properties are to be provided or if multilayer fiber structures are desired.

Fibers with a fiber titer of up to 6.7 dtex are particularly suitable for interlining materials. Coarser titers are not normally used because of their high fiber stiffness. Preference is given to fiber titers in the range of 1.7 dtex, although microfibers with a titer of <1 dtex are also conceivable.

In a particularly preferred embodiment of the invention, the backing layer has an area density of 5 to 300 $g/m^2$, more preferably 10 to 100 $g/m^2$, more preferably 10 to 40 $g/m^2$, and in particular 10 to 30 $g/m^2$.

A hot melt adhesive may be applied to the polyurethane mixture. In a preferred embodiment of the invention, the polyurethane coating is therefore formed as a bottom layer in a two-layer adhesive compound structure comprising a bottom layer bearing directly on the textile fabric and comprising the polyurethane mixture and a hot-melt adhesive top layer arranged on the bottom layer.

Hot-melt adhesives, also referred to as hot-setting adhesives, hot adhesives or hot-melts, have long been known. Generally, they are understood to mean substantially solvent-free products which, in the molten state, are applied to an adhesive surface, set rapidly on cooling and thus rapidly build up strength. According to the invention, thermoplastic polymers, such as polyamides (PA), polyesters (PES), ethyl vinyl acetate (EVA) and copolymers thereof (EVAC), polyethylene (PE), polypropylene (PP), amorphous polyalphaolefins (APAO), polyurethanes (PU) etc. are preferably used as hot-melt adhesives. Polyamides are particularly preferred according to the invention since they can have a high washing resistance of, in particular, at least 95° C. and garment dyeing durability.

In principle, the adhesive effect of the hot-melt adhesives is based on the fact that they can be reversibly fused as thermoplastic polymers and, as a liquid melt, are able, on account of their viscosity lowered by the melting process, to wet the surface to be adhesively bonded and thereby form adhesion thereto. As a result of the subsequent cooling, the hot-melt adhesive sets again to form the solid which has high cohesion and in this way produces the bond to the adhesive surface. After the adhesion has taken place, the viscoelastic polymers ensure that the adhesion is maintained, even after the cooling process, with its volume changes and the associated buildup of mechanical stresses. The cohesion established provides the bonding forces between the substrates.

The hot-melt adhesives are advantageously used in powder form. The size of the particles is based on the surface to be printed, for example the desired size of a binding dot. In the case of a dot pattern, the particle diameter may vary between >0 μm and 500 μm. In principle, the particle size of the hot-melt adhesive is not uniform but follows a distribution, i.e., a particle size range is always present. The particle size is expediently matched to the desired application quantity, dot size and dot distribution.

Hot-melt adhesives in powder form can be applied by means of scattering, which is expedient in particular for adhering porous substrates for the production of overall breathable textile composites. A further advantage of the scattering application is that it is a simple application method for applications on a large scale. Since thermoactivated powders, for example comprising polyamides, polyesters or polyurethanes, are already adhesive at low temperatures, they are suitable for the gentle lamination of heat-sensitive substrates, for example high-quality textiles. Thanks to good flow properties in the activated state, a good bond is produced even at low pressure and with a short pressing time; however, the risk of penetration into the fabric remains low.

In the case of a flat polyurethane coating, the polyurethane mixture constitutes the bottom layer of a two-layer adhesive compound structure on which a hot-melt adhesive top layer is arranged. The hot-melt adhesive top layer may be in the form of a dot pattern or have a planar design.

In a preferred embodiment of the invention, the two-layer adhesive compound structure is one in which the polyurethane mixture and hot-melt adhesive are formed as double dots, wherein the polyurethane mixture is configured as a base dot pattern and the hot-melt adhesive as a top dot pattern. In this case, the double dots can be distributed in a regular or irregular pattern on the backing layer.

According to the invention, two-layer adhesive compound structures are to be understood as both the planar two-layer adhesive compound structure described above and as double dots. Accordingly, the term "bottom layer" is to encompass both planar bottom layers and base dots, and the term "top layer" is to encompass both planar top layers and top dots.

The double dot based on a polyurethane mixture as base dot and a loose powder as top dot is preferably applied to the backing layer in a dot pattern. The softness and the resilience of the material are thus enhanced. The dot pattern may be regularly or irregularly distributed. However, printing is by no means limited to dot patterns. The double dot can be applied in any desired geometry, for example also in the form of lines, stripes, net-like or grid-like structures, dots with a rectangular, diamond-shaped or oval geometry or the like.

The two-layer adhesive compound structures are distinguished by a low adhesive compound strike-back since the polyurethane mixture applied first can act as a barrier layer.

The top and bottom layers can advantageously be applied in the form of the classic double-dot coating. In order to form the base dot, the polyurethane mixtures can be used in the form of polyurethane dispersions. They can have a melting point >190° C. and thus do not contribute to bonding during fusing. The advantage of such a base dot is that it can be easily designed to be, for example, soft, tack-free, elastic, film-forming, compatible with further additives, lightfast (yellowing-free). The use of the crosslinker in the polyurethane mixture further makes it possible to greatly improve the bonding to the top dot, to the backing layer and within the polymer matrix and thereby to increase the separation force of the adhesive compound system. A crosslinked polyurethane base dot therefore offers the advantage that the back-tacking can be considerably reduced as a result.

For the interlining region, it is advantageous if a granulate (generally 80-200 μm) which has good grindability is used to produce the top layer.

It is likewise conceivable that no clear phase boundary can be seen between the top layer and the polyurethane mixture bottom layer. This can be brought about, for example, by applying the polyurethane mixture in a mixture with a particulate thermoplastic material, for example in the form of a dispersion, and optionally still further components.

After application, the particulate thermoplastic material is separated in the polyurethane mixture, the coarser particles coming to rest more on the top side of the bonding surface, for example the dot surface. Although the coarser polymer particles are bound in the polyurethane matrix, their free (top) surface is at the same time available on the surface of the non-woven for direct bonding with the outer fabric. A double-dot-like structure is formed but, in contrast to the known double-dot method, only a single method step is required to produce this structure, and the complex suctioning off of excess powder is also dispensed with. In this way, the interlinings have a higher elasticity and a higher rebound capacity than those with conventional polyamide-based or polyester-based polymers.

The double dot based on a, preferably aqueous, dispersion as base dot and a loose powder as top dot is preferably applied to the backing layer in a dot pattern, as described above. The softness and the resilience of the material are thus enhanced. The dot pattern may be regularly or irregularly distributed. However, printing is by no means limited to dot patterns. The double dot or the paste can be applied in any desired geometry, for example also in the form of lines, stripes, net-like or grid-like structures, dots with a rectangular, diamond-shaped or oval geometry or the like.

A preferred method for producing a thermally fusible textile fabric comprises the following steps:
a) providing a backing layer,
b) producing a polyurethane mixture comprising at least one polyester urethane (B1), at least one polyether urethane (B2) and at least one polycarbonate urethane (B3) and at least one isocyanate, which is blocked with a blocking agent at at least one isocyanate group, as crosslinker,
b) applying the polyurethane mixture to selected surface regions of the backing layer to form an adhesive compound structure, and
c) temperature treatment of the backing layer obtained from step b) for at least partial crosslinking of the polyurethane mixture and simultaneously for bonding of the polyurethane mixture to/with the surface of the backing layer.

With the method according to the invention, the surface according to the invention formed by one or a plurality of the embodiments described here can be produced in a simple manner.

A further subject matter of the invention is a thermally fusible textile fabric which can be produced using the method described above.

The adhesive compound structure is preferably formed as a two-layer adhesive compound structure, as explained above, with bottom layer and top layer. In order to form the bottom layer, firstly the polyurethane mixture, preferably in the form of an aqueous dispersion, can be applied to the textile fabric. A hot-melt adhesive, in particular a thermoplastic material, preferably in the form of a loose powder, can subsequently be applied to said dispersion.

The backing layer made of a textile material or of nonwoven material can be printed with the polyurethane mixture directly in a printing machine. For this purpose, it may be appropriate to provide the polyurethane mixture with textile auxiliaries, such as thickeners (for example partially crosslinked polyacrylates and salts thereof), dispersants, wetting agents, flow aids, feel modifiers, or to treat it in any other way such that the printing process becomes more reliable in production.

In a preferred embodiment of the invention, the temperature treatment is carried out at temperatures of 80° C. to 200° C., more preferably at temperatures of 100° C. to 150° C., and in particular at temperatures of 120° C. to 140° C.

In a further preferred embodiment of the invention, the method comprises at least one dyeing treatment, in particular "garment dyeing" of the textile fabric. The dyeing treatment is expediently carried out after fusing the interlining to the outer fabric.

A further subject matter of the invention is the use of the textile fabric according to the invention as an interlining material for fusing to an outer fabric, preferably having an air permeability of <100 dm$^3$/s*m$^2$ at a test pressure of 200 Pa measured in accordance with EN ISO 9237.

However, the use of a thermally fusible textile fabric according to the invention is not limited to this application. Other applications are also conceivable, for example as fusible textile fabrics in home textiles, such as upholstered furniture, reinforced seat constructions, seat covers or as a fusible and extensible textile fabric in automotive equipment, in shoe components or in the hygiene/medical sector.

The invention is described below, without loss of generality, with reference to the example of using a thermally fusible textile fabric according to the invention as a fusible interlining material in the textile industry.

Example 1

A knitted base (100% polyamide) with 15 g/m$^2$ area density is coated according to the known double-dot method. Use is made here of an acrylate-based base dot, a polyester polyurethane binder base dot (without fillers, without crosslinkers) from the prior art and the polyurethane binder base dot according to the invention, which contains a blocked isocyanate and fine-particle, amorphous and hydrophilic silica. The respective base dots are maintained with a washing-resistant polyamide powder. In this case, binders which have been prepared with the usual auxiliaries, such as emulsifiers, thickeners and processing aids, are used for the base dots. The polyamide used as the top dot has a melting point of 118° C. and an MFI value of 30 (g/10 min) (determined at 160° C. under a load of 2.16 kg).

The composition of the binder base dot according to the invention is shown in the following Table 1.

TABLE 1

| | Weight [%] based on total weight of polyurethane mixture |
|---|---|
| PU dispersion 1 (mixture of polycarbonate urethane, polyester urethane and polyether urethane) | 65.0 |
| PU dispersion 2 (polycarbonate urethane) | 19.0 |
| Blocked aliphatic isocyanate | 3.0 |
| Silica | 3.0 |
| Additive | 9.0 |

In the coating process, 5 g of base dot binder paste are applied in each case and coated with 8 g of loose powder. The coated interlinings obtained in this way are fused at a temperature of 120° C. for 12 sec and a pressure of 2.5 bar (press: Kannegiesser EXT 1000 CU). A PES/cotton outer fabric is used to determine the primary separation force and washing stability. A cotton outer fabric is used to determine the garment dyeing results. In this case, fusing is carried out at 140° C. for 15 sec and at 2.5 bar.

The results are shown in the following Tables 2 and 3:

TABLE 2

| Binder | Primary separation force [N/5 cm] | 3 × 95° C. washing [N/5 cm] | Rebound capacity [N/10 cm] |
|---|---|---|---|
| Acrylate | 18.2 | 1.3 | 1.1 |
| PU comparison | 31.2 | 15.7 | 2.1 |
| PU according to the invention | 34.1 | 22.2 | 1.8 |

TABLE 3

| Binder | Primary separation force [N/5 cm] | GD [N/5 cm] | Surface after GD |
|---|---|---|---|
| Acrylate | 14.2 | 0 | Complete debonding |
| PU comparison | 29.6 | 5.5 | Partial debonding (mole tunnels), uneven surface |
| PU according to the invention | 28.1 | 8.2 | Smooth surface, complete adhesive bonding |

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed with the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A thermally fusible textile fabric usable as a fusible interlining material in the textile industry, comprising:
   a backing layer comprising a textile material on top of which has been applied an adhesive compound structure comprising a polyurethane coating containing a polyurethane mixture comprising at least one polyester urethane, at least one polyether urethane, and at least one polycarbonate urethane,
   wherein the polyurethane mixture has been prepared by physically mixing at least one polyester urethane, at least one polyether urethane, and at least one polycarbonate urethane, wherein each of the at least one polyester urethane, the at least one polyether urethane, and the at least one polycarbonate urethane are prepared separately from one another prior to being physically mixed,
   wherein the polyester urethane is prepared by reacting at least one bifunctional polyisocyanate, having an isocyanate content of 5 to 65 wt. %, with:
     at least one polyester polyol, and
     optionally at least one chain extender,
   wherein the polyether urethane is prepared by reacting at least one bifunctional polyisocyanate, having an isocyanate content of 5 to 65 wt. %, with:
     at least one polyether polyol, and
     optionally at least one chain extender,
   wherein the polycarbonate urethane is prepared by reacting at least one bifunctional polyisocyanate, having an isocyanate content of 5 to 65 wt. %, with:
     at least one polycarbonate polyol, and
     optionally at least one chain extender,
   wherein the at least one chain extender, if present, is selected from the group consisting of divalent aliphatic C1-C8 alcohols, and
   wherein the polyurethane mixture has been at least partially crosslinked with a crosslinker comprising at least one isocyanate blocked with a blocking agent at at least one isocyanate group.

2. The thermally fusible textile fabric according to claim 1, wherein the polyurethane mixture was produced by mixing the at least one polyester urethane with the at least one polyether urethane and the at least one polycarbonate urethane, and subsequently at least partially crosslinking with the crosslinker comprising the isocyanate blocked with the blocking agent at the at least one isocyante group.

3. The thermally fusible textile fabric according to claim 1, wherein the blocking agent comprises 3,5-dimethylpyrazole (DMP).

4. The thermally fusible textile fabric according to claim 1, wherein the crosslinker comprising at least one isocyanate block with a blocking agent at at least one isocyanate group has a C3-C18 alkyl radical as a base body.

5. The thermally fusible textile fabric according to claim 1, wherein the polyurethane mixture has a degree of crosslinking of 0.01 to 0.5.

6. The thermally fusible textile fabric according to claim 1, wherein the polyurethane mixture comprises silica having an average particle size of 2 to 20 μm as filler.

7. The thermally fusible textile fabric according to claim 6, wherein an amount of silica in the polyurethane mixture is 0.5 to 55 wt. %, based in each case on a total weight of the polyurethane mixture.

8. The thermally fusible textile fabric according to claim 1, wherein the backing layer has an area density of 10 to 40 g/m$^2$.

9. The thermally fusible textile fabric according to claim 1, wherein the at least one bifunctional polyisocyanate comprises an aliphatic, cycloaliphatic, or aromatic polyisocyanate.

10. The thermally fusible textile fabric according to claim 1, wherein the blocking agent has a deblocking temperature of below 160° C.

11. The thermally fusible textile fabric according to claim 10, wherein the deblocking temperature is between 110-140° C.

12. The thermally fusible textile fabric according to claim 11, wherein the deblocking temperature is between 120-130° C.

13. The thermally fusible textile fabric according to claim 1, wherein the polyurethane mixture comprises the crosslinker in an amount of from 0.1 to 20 wt. %, based in each case on a total weight of polyurethane.

14. The thermally fusible textile fabric according to claim 13, wherein the polyurethane mixture comprises the crosslinker in an amount of from 1 to 10 wt. % based in each case on the total weight of the polyurethane.

15. The thermally fusible textile fabric according to claim 14, wherein the polyurethane mixture comprises the crosslinker in an amount of from 2 to 6 wt. %, based in each case on the total weight of the polyurethane.

16. The thermally fusible textile fabric according to claim 1, wherein the adhesive compound structure comprises a two-layer adhesive compound structure comprising a bottom layer bearing directly on the textile fabric and comprising the polyurethane mixture, and a top layer arranged on the bottom layer and comprising hot-melt adhesive.

17. The thermally fusible textile fabric according to claim 16, wherein the polyurethane mixture and hot-melt adhesive are formed as double dots, and
   wherein the polyurethane mixture comprises a base dot pattern and the hot-melt adhesive comprises a top dot pattern.

18. A method for producing a thermally fusible textile fabric, comprising the following steps:
   a. providing a backing layer,
   b. producing the polyurethane mixture of claim 1;
   c. applying the polyurethane mixture to selected surface regions of the backing layer to form an adhesive compound structure; and
   d. temperature treating the backing layer obtained from step b) for at least partial crosslinking of the polyurethane mixture and simultaneously for bonding of the polyurethane mixture to/with the surface of the backing layer.

19. The method according to claim 18, wherein the temperature treating is carried out at temperatures of 80° C. to 200° C.

20. The thermally fusible textile fabric produced by the method according to claim 18.

21. A method of using the textile fabric according to claim 1 as interlining material for fusing to an outer fabric, the outer fabric having an air permeability of air permeability <100 dm$^3$/s*m$^2$ at a test pressure of 200 Pa measured in accordance with EN ISO 9237.

\* \* \* \* \*